July 23, 1940.                T. M. BALL ET AL                2,208,621

FUEL TANK

Filed Sept. 20, 1937

INVENTORS.
Thomas M. Ball,
Andre J. F. Royalet,
BY
Harness, Dind, Pate & Hawn
ATTORNEYS.

Patented July 23, 1940

2,208,621

UNITED STATES PATENT OFFICE 2,208,621

FUEL TANK

Thomas M. Ball and Andre J. E. Roualet, Detroit, Mich., assignors to Chrysler Corporation, Highland Park, Mich., a corporation of Delaware Application September 20, 1937, Serial No. 164,694

3 Claims. (Cl. 220—1)

This invention relates to improved fuel tanks.

More particularly, the invention pertains to improved fuel tanks for motor vehicles, aircraft, and the like.

One of the main objects of the invention is to provide an improved fuel tank having a simple and inexpensive means for trapping the water and other foreign matter within the fuel tank so that the latter will have a maximum of effective capacity for fuel.

More specifically, the invention has for one of its objects the provision of a fuel tank of this character in which the bottom surface of the fuel tank has formed integrally therewith a dished water sump portion extending below the rest of the fuel tank structure and which is so arranged as to permit convenient draining of water even when this tank is not level.

A further object of the invention resides in the provision of a fuel tank of this character by which a small quantity of water may be added to the fuel tank when the fuel level has dropped below the fuel intake level so as to raise the fuel level to the fuel outlet member to permit the motor to operate a short time longer in an emergency, the motor operator then draining this water preferably prior to adding fuel to the fuel tank.

Other objects of the invention are to provide a fuel tank of this kind in which any water will freeze in a solid mass safely below the fuel outlet member instead of forming many small ice crystals which would mix with the fuel and pass into the fuel system; to provide a fuel tank of this character in which water, ice, or other foreign matter within the tank is not readily sucked into the fuel system by the improved fuel outlet member which reduces the velocity of the fuel intake at its open extremity; and to provide a fuel tank of this character having a main body portion and a sump portion by which it is possible to drain liquid from these portions from a level not lower than the sump portion so as to allow maximum road clearance when installed on a motor vehicle.

Other objects and advantages of the invention will be more apparent from the following description taken in connection with the accompanying drawing, in which.

Figure 1:
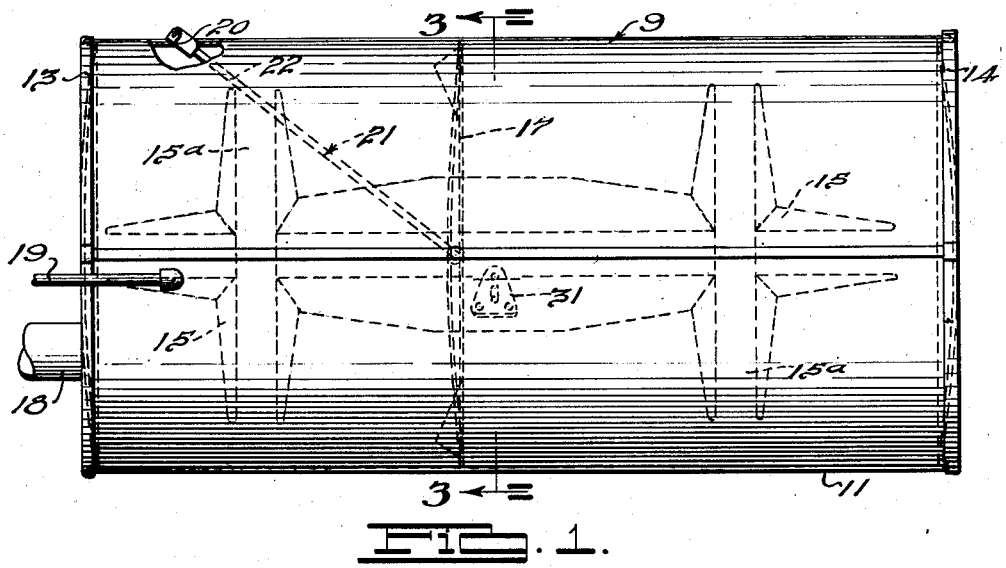
Fig. 1 is a plan view of a fuel tank embodying the invention, a portion being broken away to show the underlying structure.
Figure 2:
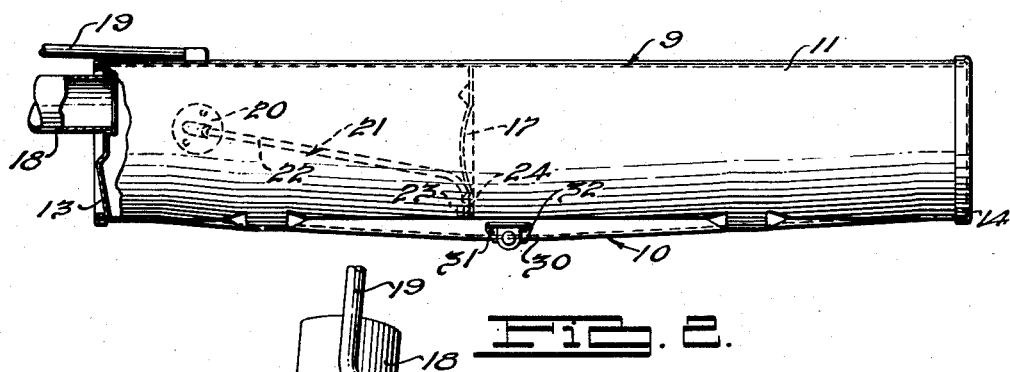
Fig. 2 is a side elevational view, partly in section, of the fuel tank shown in Fig. 1.
Figure 3:
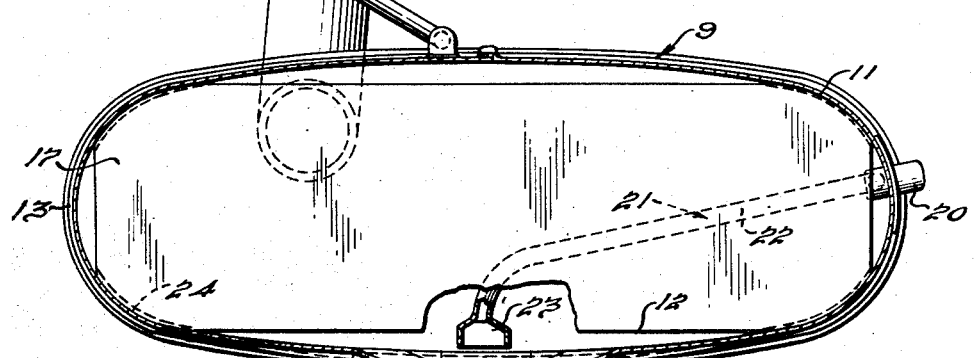
Fig. 3 is an enlarged detail sectional view taken as indicated by the line 3—3 of Fig. 1.

In the form of the invention shown in the drawing, the improved fuel tank comprises a main body portion, generally indicated by the numeral 9, for accommodating the major portion of the fuel in the tank, and a sump trough portion 10. The particular fuel tank illustrated is of an oval cross-section, but other shapes and forms of fuel containers may be used with out departing from the scope of the invention.

The main body portion comprises a wall member 11 of oval cross-section with a lower opening 12 and a pair of end members 13 and 14 secured thereto by soldering or some other suitable means. The lower surface of the wall member 11 has a lattice of grooved portions 15 which are so arranged as to extend downwardly toward the common trough 10. The trough 10 tapers in depth from the central part of the tank to locations adjacent the ends thereof.

Seats 15ª are provided between the transversely extending portions of the lattice of grooves 15 for the reception of tank fastening bands (not shown) by which the tank may be secured to the chassis of the vehicle. A central baffle member 17 is suitably secured to the main body portion 9 substantially midway between the end members 13 and 14 to prevent surging of the fuel and to reinforce the portion 9.

A tubular fuel inlet member 18 suitably secured to the end member 13 admits fuel into the fuel tank. The upper surface of the wall member 11 has secured thereto an air vent tube 19 which is in communication with the atmosphere inside and outside of the fuel tank in a manner well known to those familiar with the art.

Fixed to and extending through the wall member 11 at 20 is a tubular fuel outlet member 21 which allows the discharge of fuel from the fuel tank during consumption of the fuel. The member 21 comprises a tubular portion 22 and a tubular end portion 23 supported at 24 by the baffle member 17 at the vertical longitudinal mid-plane of the main body portion 9, the portion 23 being of larger diameter than the portion 22 and extending to a location in close proximity to the trough 10.

The trough portion comprises sloping surface portions 26, 27 and 28 which extend both lengthwise of the fuel tank to substantially the end members 13 and 14, and also sidewise to substantially a pair of lines 29 running lengthwise of the fuel tank. The grooved portions 15 of the lower surface of the wall member 11 and the portions 26, 27 and 28 of the trough portion 10 form a contour which slopes downwardly toward the lowest portion of the sump 25, generally indicated at 30.

Provision is made for draining fluid from the portions 9 and 10 by the use of a member which is supported at least as high as the trough portion 10 to allow maximum road clearance when the fuel tank is installed on a motor vehicle. To effect this desirable maximum road clearance, an internally threaded tubular member 31 is secured to the side portion 27 by rivets 32 or some other suitable fastening means, the tubular member 31 being in communication with the trough portion 10. A plug 33 is in threaded engagement with the tubular member 31 to prevent unintended passage of fluid therethrough.

In the operation of this particular embodiment, the fuel is admitted through the inlet member 18 to the portions 9 and 10, the vent tube 19 allowing the displaced air to escape. As the fuel is drawn for consumption from the fuel tank through the fuel outlet member 21, the relative position of the end portion 23 of the member 21 and the trough portion 10 will permit the fuel level to drop as far as the lower surface of the portion 23 while any foreign matter such as water will remain in the trough portion 10. This relative positioning of the portions 23 and 10 provides a fuel tank having a maximum of effective capacity for fuel for it is not necessary, with a tank embodying the invention, to maintain a large factor of safety in the distance between the normal lower wall of the tank and inlet end of the discharge passage to provide for the variations in depth of the accumulated water which surges from end to end of a tank of conventional construction.

The portions 15, 26, 27 and 28 have a contour which slopes downwardly toward the common trough 10 so that there is a natural drain of water or foreign matter to this point where it may be drained if desired even when the tank is not on an even keel.

Any water or other foreign substance within the trough portion 10 will freeze in low temperatures to a solid mass safely below the fuel outlet member 21 instead of forming many small ice crystals which would mix with the fuel and pass into the fuel system through the member 21.

Water, ice, or other foreign matter within the fuel tank is not readily sucked into the fuel system through the member 21. As the fuel is sucked out of the portion 22 of the member 21, the fuel passes therethrough with a certain velocity, and the enlarged portion 23 by reason of its larger diameter reduces the velocity of the fuel sucked up; consequently any water or other foreign matter is filtered out of the fuel and eventually accumulates in the trough portion 10.

When the fuel level has dropped below the portion 23 of the member 21 so that no fuel can pass through the member 21, water or some other liquid heavier than the fuel may be added in an emergency through the inlet member 18 to raise the level of the fuel to the portion 23, the foreign liquid being drained by removing the plug 33 when it is desired to add fuel to the fuel tank again.

Various modifications and changes may be effected in the illustrated application without departing from the spirit of the invention or from the scope of the appended claims.

What we claim is:

1. A fuel tank adapted to be detachably secured to a motor vehicle, comprising a main body portion including a bottom wall portion, a sump portion carried by said main body portion, said sump portion extending relatively lower than said body portion, a fuel inlet carried by said body portion for admitting fuel into said fuel tank, and a fuel outlet member carried by said body portion for allowing the fuel in said tank to be discharged therefrom during consumption of the fuel, said bottom wall portion having a plurality of vane-like depressions extending in diverse directions outwardly from said sump portion to relatively remotely disposed portions of said main body portion, said bottom wall portion further including a seat formed intermediate adjacently disposed vane-like depressions adapted to receive a securing means.

2. In a fuel tank, a main body including end wall, side wall and bottom wall portions, a portion of said bottom wall being deflected to provide a relatively shallow sump disposed in the longitudinal central midplane of said main body, portions of said bottom wall sloping downwardly in a direction from said end walls and side walls toward said sump, said last mentioned bottom wall portions having portions thereof deflected to form grooves sloping in a direction toward and communicating with said sump, some of said grooves extending transversely with respect to said main body and other of said grooves extending longitudinally with respect to said main body portions, said grooves communicating respectively with portions of said main body relatively remotely disposed from said sump, and a seat formed intermediate adjacently disposed transversely extending grooves adapted to receive an attaching means.

3. In a fuel tank, a main body including end walls and a bottom wall, portions of said bottom wall sloping in opposite directions with respect to said end walls to provide a relatively shallow sump, said bottom wall having a plurality of depressions formed therein and extending longitudinally and transversely respectively with respect to said main body, said depressions communicating with said sump and portions of said main body relatively remotely disposed from said sump and being inclined in a direction toward the latter, a vertically disposed baffle extending transversely of said main body across said sump, and fuel outlet means including a conduit extending into said main body and secured to said baffle, said conduit having an enlarged unrestricted fuel inlet end, said end overlying said sump and being so arranged as to effect withdrawal of substantially the entire fluid content of said main body without withdrawing liquid from said sump.

THOMAS M. BALL.
ANDRE J. E. ROUALET.